US011316460B2

(12) United States Patent
Dixon et al.

(10) Patent No.: US 11,316,460 B2
(45) Date of Patent: Apr. 26, 2022

(54) MOTOR POSITION CALIBRATION

(71) Applicant: ZF AUTOMOTIVE UK LIMITED, Solihull (GB)

(72) Inventors: Christopher David Dixon, Coventry (GB); Peter Geoffrey Scotson, Worcester (GB); Connel Brett Williams, Princethorpe (GB); Prerit Terway, Princeton, NJ (US)

(73) Assignees: ZF Automotive UK Limited; ZF Active Safety and Electronics US LLC, Livonia, MI (US)

( * ) Notice: Subject to any disclaimer, the term of this patent is extended or adjusted under 35 U.S.C. 154(b) by 0 days.

(21) Appl. No.: 16/953,413

(22) Filed: Nov. 20, 2020

(65) Prior Publication Data

US 2021/0159830 A1 May 27, 2021

(30) Foreign Application Priority Data

Nov. 26, 2019 (GB) ..................................... 1917218

(51) Int. Cl.
*H02P 21/18* (2016.01)
*B62D 5/04* (2006.01)

(52) U.S. Cl.
CPC ............ *H02P 21/18* (2016.02); *B62D 5/0481* (2013.01)

(58) Field of Classification Search
CPC .. H02P 21/18; H02P 6/182; H02P 6/16; H02P 25/022; H02P 8/38; B62D 5/0481; B62D 5/049
See application file for complete search history.

(56) References Cited

U.S. PATENT DOCUMENTS

| | | | | |
|---|---|---|---|---|
| 6,396,229 | B1 * | 5/2002 | Sakamoto | H02P 6/18 318/400.02 |
| 8,803,454 | B2 * | 8/2014 | Daboussi | H02P 21/34 318/400.02 |
| 10,903,768 | B2 * | 1/2021 | Kim | H02P 21/18 |
| 2004/0257027 | A1 * | 12/2004 | Matsuo | H02P 21/26 318/722 |
| 2010/0179755 | A1 | 7/2010 | Kohno et al. | |
| 2010/0320763 | A1 * | 12/2010 | Li | H02P 6/16 290/44 |
| 2013/0275069 | A1 * | 10/2013 | Bang | B60L 50/16 702/94 |
| 2014/0159632 | A1 * | 6/2014 | Kim | H02P 6/182 318/400.34 |
| 2016/0043676 | A1 * | 2/2016 | Adam | H02P 6/14 318/400.02 |
| 2019/0190421 | A1 * | 6/2019 | Shigeta | H02P 21/22 |
| 2019/0273458 | A1 * | 9/2019 | Ghaderi | B62D 5/0484 |

FOREIGN PATENT DOCUMENTS

WO 2019201961 A1 10/2019

* cited by examiner

*Primary Examiner* — Bickey Dhakal
(74) *Attorney, Agent, or Firm* — Robert James Harwood

(57) ABSTRACT

A method of determining an electrical angle offset of a motor position sensor mounted to a multi-phase electric motor, the method comprising rotating a rotor of the multi-phase electric motor at a motor velocity using an external drive system, measuring a motor phase voltage of each phase of the multi-phase electric motor, the motor phase voltage comprising a back-EMF generated by the rotation of the motor, converting the motor phase voltage to a DQ reference frame to form a DQ motor phase voltage and calculating the electrical angle offset from the DQ motor phase voltages.

17 Claims, 4 Drawing Sheets

MOTOR POSITION CALIBRATION

CROSS-REFERENCE TO RELATED APPLICATION

This application claims priority to UK Patent Application No. 1917218.8 filed Nov. 26, 2019, the disclosure of which is incorporated herein by reference in its entirety.

TECHNICAL FIELD

The present disclosure relates to a method of determining an electrical angle offset of a motor position sensor, particularly but not necessarily exclusively for use in a vehicular electric motor, such as an electric power-assisted steering (EPAS) system motor.

BACKGROUND

Permanent magnet synchronous motors, also known as multi-phase electric motors, are well-known for use in a wide range of applications. They have proven especially suitable for use in electric power-assisted steering (EPAS) systems due to their ability to operate precisely over a wide range of torques as well as being robust and cost-effective. In an EPAS system, the motor is driven in response to a torque demand signal to apply a torque to a steering shaft or other part of the steering mechanism that helps the driver to turn the wheel.

To ensure optimal torque generation by the motor, it is necessary for the electrical position of the motor to be accurately known, relative to the zero-crossing of the back-EMF of the motor. Due to manufacturing tolerances, the position sensor system cannot be fitted easily to the system with a high level of accuracy and therefore an alignment error remains between the zero-position (physical) of the position sensor and the zero-position (electrical) of the motor. More accurate alignment of the position sensor and motor would be costly and time-consuming, and therefore is generally unsuitable for use in this context. Present manufacturing techniques and timings allow an alignment accuracy of about ±15° relative to the electrical zero-position of the motor.

In known systems, the remaining alignment error must be removed as part of the end of line (EOL) calibration process for each motor. One such method is that of disabling the current control of the motor and subsequently supplying a Q-axis voltage to the motor in each direction of rotation, consecutively, measuring the resultant speed of the motor in each direction. The position offset can then be adjusted in order that identical speeds for a given voltage demand are produced in both directions of rotation. This is highly time-consuming.

As a time-saving measure, a mapping can be produced for each motor variant in order that any lack of symmetry in the speeds of rotation can be quickly determined as a particular angular offset. In this way, the speeds need only to be checked once, the correction then being applied by mapping the asymmetrical speeds to the corresponding angular offset stored in the map. A disadvantage of this is that producing the mapping is a time-consuming process and is required for each motor variant, as well as if the magnetic design of any single variant is updated. Electromagnetics can also cause distortion to the mapping such that there is not a clear direct map for every position offset.

SUMMARY

An improved method of determining an electrical angle offset is therefore desirable.

According to a first aspect, there is provided a method of determining an electrical angle offset of a motor position sensor mounted to a multi-phase electric motor, the method comprising:
rotating a rotor of the multi-phase electric motor at a motor velocity using an external drive system;
measuring a motor phase voltage of each phase of the multi-phase electric motor, the motor phase voltage comprising a back-EMF generated by the rotation of the motor;
converting the motor phase voltage to a DQ reference frame to form a DQ motor phase voltage;
calculating the electrical angle offset from the DQ motor phase voltages.

In this way, the electrical angle offset can be determined for each electric motor individually in a quicker manner than was previously possible. The method requires no calibration of compensation tables and requires reduced time and effort. The back-EMF of the motor can also be measured as a by-product of the process, which may be used in other calculations.

The motor phase voltages may be first converted to an $\alpha\beta$ reference frame prior to conversion to the DQ reference frame.

The method may further comprise the step of normalising the motor phase voltages to the motor velocity to form normalised motor phase voltage prior to conversion into the DQ motor phase voltage.

This ensures that the method is invariant to speed changes of the motor, for example so that the motor need not be rotated at a steady speed or such that it may be rotated in either direction without any alteration required to parameters of the method.

The step of calculating the electrical angle offset from the DQ motor phase voltages may be performed by adjusting a position offset until a D-axis component of the DQ motor phase voltage is zero, at which point it can be determined that the position offset is equal to the electrical angle offset.

The position offset may be used in the step of converting the normalised motor phase to the DQ reference frame to form the DQ motor phase voltage.

The step of calculating the electrical angle offset from the DQ motor phase voltages may be performed by a closed loop controller.

The closed loop controller may be a PI controller.

The step of calculating the electrical angle offset from the DQ motor phase voltages may be performed by using an inverse tan function.

The step of calculating the electrical angle offset from the DQ motor phase voltages may include an application of a time lag correction to take into account the motor velocity when performing the corrections.

This can minimise the angular error introduced when operating the motor at higher speeds due to the time delay in the processing of the signal.

The time lag correction may be applied by filtering a motor velocity signal indicative of the motor velocity with a time lag filter coefficient.

The motor velocity may be a constant velocity.

Ensuring that the velocity of rotation is constant can simplify the signal processing and speed up the process.

The motor velocity may be above a minimum velocity and/or may be below a maximum velocity.

The method may further comprise the step of removing DC offsets from the motor phase voltages.

Removing the DC offsets may remove additional harmonic content in order to improve performance of the method.

During operation of the method, a drive stage controller of the multi-phase electric motor may be disabled.

The electrical angle offset may be filtered with an offset filter coefficient.

The filtering can minimise noise within the system.

BRIEF DESCRIPTION OF THE DRAWINGS

Specific embodiments will now be described with reference to the accompanying drawings, in which.

DETAILED DESCRIPTION

Figure 1:
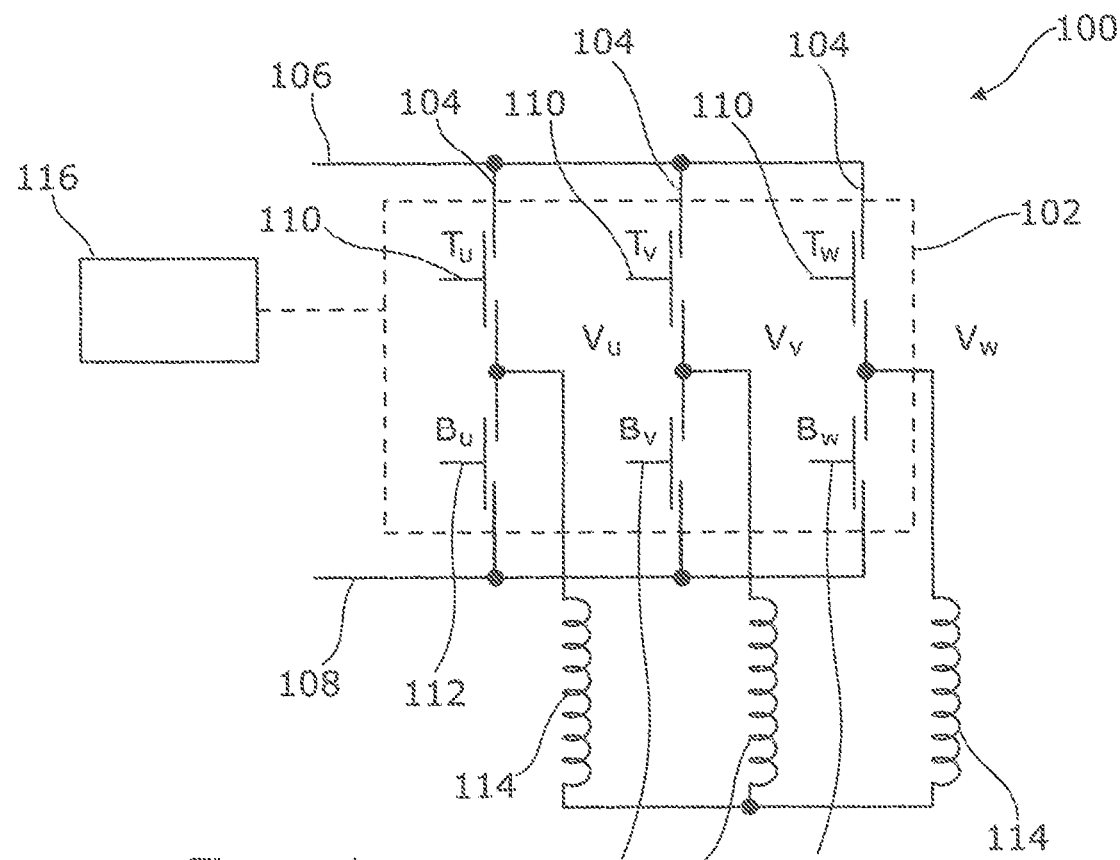
FIG. 1 shows the drive stage of an electric motor and the three motor phases to which they are connected.
Figure 8:
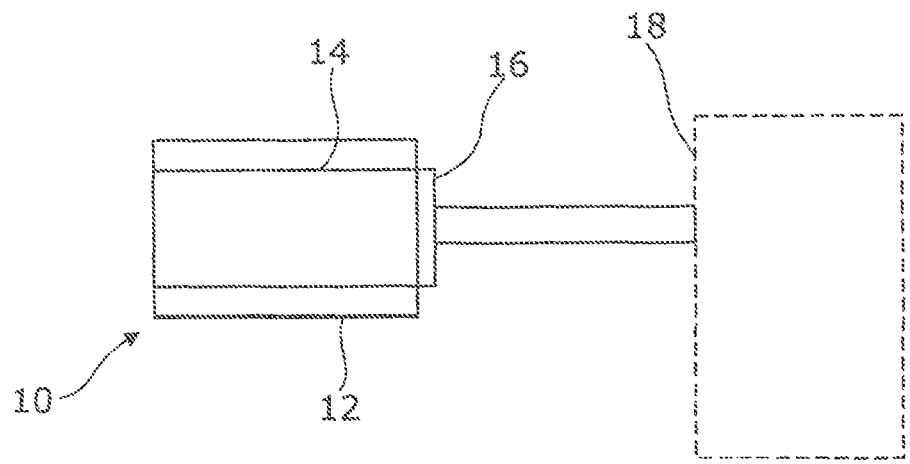
FIG. 8 shows a simplified view of an electric motor in engagement with an external drive device, for operation of the method of the first aspect.

Firstly referring to FIG. 1, there is shown a drive circuit 100 for a three-phase synchronous electric motor 10. The electric motor 10 is shown in simplified version in FIG. 8. The drive circuit 100 includes a drive stage having three branches 104 connecting a positive rail 106 to a ground rail 108. Each branch 104 includes a top switch 110 and a bottom switch 112 arranged in a pair, which are electrical switches controllable to provide power to the three phases 114 of the motor 10, which are contained within a stator 12 of the motor 10. In the depicted embodiment, the top switches 110 and bottom switches 112 are provided as MOSFETs, but other electrically-controlled switches may also be used.

The phases 114 of the motor 10 are connected in a Y- or star-configuration with a first end of each phase 114 connecting to a junction between a top and bottom switch 110, 112 of the drive stage 102 and the second end connecting to a common junction of the three phases 114. The top and bottom switches 110, 112 are operated by a motor drive controller 116 that controls the switches 110, 112 to transform the direct current provided at the positive rail 106 to an alternating current provided to the motor phases 114, by way of pulse width modulation (PWM). A rotor 14 of the motor 10 is therefore caused to rotate. The manner in which the PWM signal is controlled will be well-known to the skilled person and will not be discussed further in the present application.

In order to control the motor 10 in an effective and efficient manner, it is necessary to know the position of the rotor 14 of the motor 10 when applying the PWM signals to the phases 114. In order to do this, a position sensor 16, for example in the form of a rotary encoder, is mechanically attached to the rotor 14 during assembly of the system, the output of the position sensor 16 being used to ensure that the correct signals are provided to the drive stage 102 of the motor 10 during use. As it is difficult and time-consuming to ensure perfect accuracy of the assembly, a misalignment, or electrical angle offset, remains between the zero-position of the position sensor 16 and the zero-position of the rotor 14.

The motor 10 can be defined in the DQ reference frame by the equations:

$$\frac{d}{dt}\{\underline{i_{ds}}(t)\} = \frac{1}{L_d}\left[\underline{u_{ds}}(t) - R_s\underline{i_{ds}}(t) + L_q p\omega_m\underline{i_{qs}}(t)\right]$$

$$\frac{d}{dt}\{\underline{i_{qs}}(t)\} = \frac{1}{L_q}\left[\underline{u_{qs}}(t) - R_s\underline{i_{qs}}(t) + L_q p\omega_m\underline{i_{ds}}(t) - \frac{K_e}{\sqrt{3}}\omega_m(t)\right]$$

where:
$i_d$—D-axis current
$i_q$—Q-axis current
$u_d$—D-axis voltage
$u_q$—Q-axis voltage
$L_d$—D-axis inductance
$L_q$—Q-axis inductance
$R_s$—phase resistance
p—number of magnet pole pairs
$\omega_m$—motor speed
$K_e$—back-EMF constant Rearranging the equation, with zero current flowing in the motor 10, the voltage is generated at the terminals only when the motor 10 is rotated, and the back-EMF generated is only present on the Q-axis. The fact that the back-EMF appears only on the Q-axis can be used to determine the correct electrical angle offset; if the D-axis voltage is not equal to zero then the electrical angle offset is incorrect.

Figure 2:
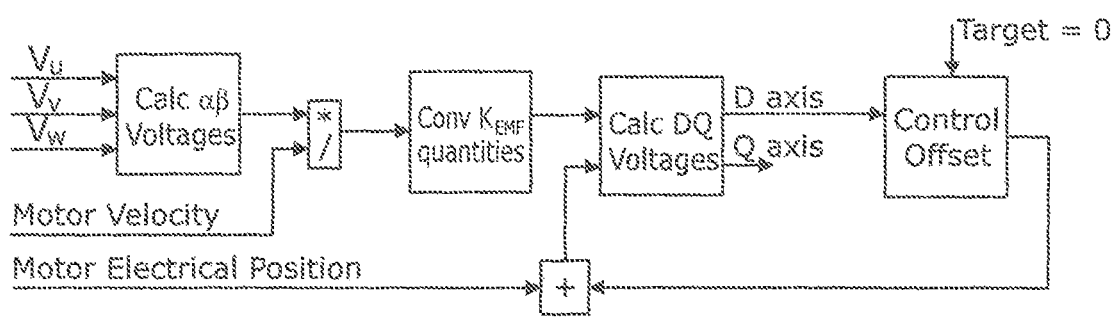
FIG. 2 shows the operation of a controller performing the method of the first aspect.

It is therefore possible for the controller 116 to be configured to determine the electrical offset of the motor position sensor 16 after assembly. The operation of the controller 116 is depicted in FIG. 2. The controller 116 is configured to operate whilst the motor 10 is being driven by an external drive system 18, such as another electric motor. The forced rotation of the motor 10 causes a back-EMF to be generated by the phases 114 of the electric motor 10 as the rotor 14 rotates within the stator 12. There is therefore no active control of the motor 10 by the drive stage 102 as the electrical angle offset of the position sensor 16 is being determined. Thus, at zero motor speed, the voltage sensed from each of the phases 114 will be zero.

Any DC offset bias can therefore be removed from the voltage measurements before any rotation of the motor 10. Whilst the DC offsets present in the phase voltage measurements do not affect the mean calculated DQ quantities, they do result in additional harmonic content, the removal of which improves the performance of the algorithm executed by the controller 116.

Figure 3:
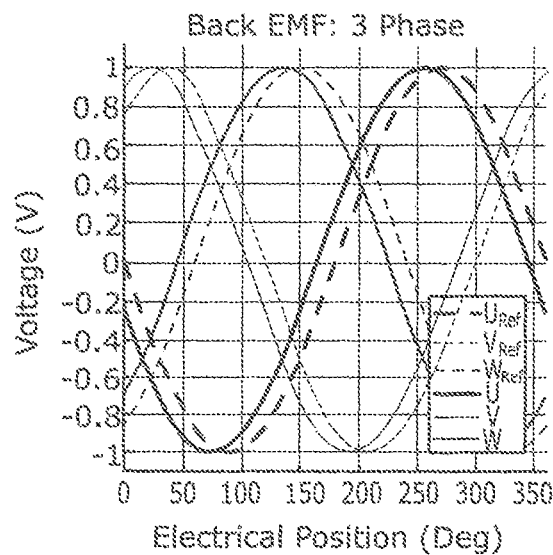
FIG. 3 shows an example of a measurement of back-EMF in each phase for a motor being rotated at a constant speed, for both an aligned reference and a motor with a 15° offset.

When the motor 10 is rotated, the controller 116 receives a motor phase voltage $V_U$, $V_V$, $V_W$ from each phase 114 of the motor 10. This is shown in FIG. 3. The controller 116 can then convert these motor phase voltages to the αs reference frame, for example by performing a Clarke transformation. The back-EMF generated during rotation of the motor 10 is proportional to the motor speed as well as to motor direction. As such, it is advantageous, although not necessary, to normalise the motor phase voltages to the motor velocity prior to further processing. Normalisation to the motor direction may require an additional compensation term of 180° to be added. Not normalising the motor velocity may require an additional compensation term to be added to the calculated offset.

It may be necessary for the motor 10 to be rotated above a minimum speed in order for to determine the offset. The minimum speed may be limited by how accurately the back-EMF can be measured, as the back-EMF tends to zero as the speed decreases. The minimum speed may be around 50 rpm.

A maximum speed of operation may be limited by the maximum voltage that the ECU can measure, as the voltage increases with the speed of rotation—back-EMF is proportional to speed of rotation. As the voltage signals measurable by the ECU will be based around the voltages expected to be seen in use, the maximum voltage may be around 30V for a 12V system.

Whilst the magnitude of the motor phase voltages may not be required for offset correction, it can be used to measure the back-EMF constant ($K_{EMF}$) once the signals have been converted to the DQ reference frame. The KEMF defines the voltage generated by the motor for a given speed and is defined herewith as the peak voltage per radian per second. Using this definition and the model of the motor as defined above, the scaling factor is $\sqrt{3}/2\pi$ (with the motor speed in rev/s).

Figure 5:
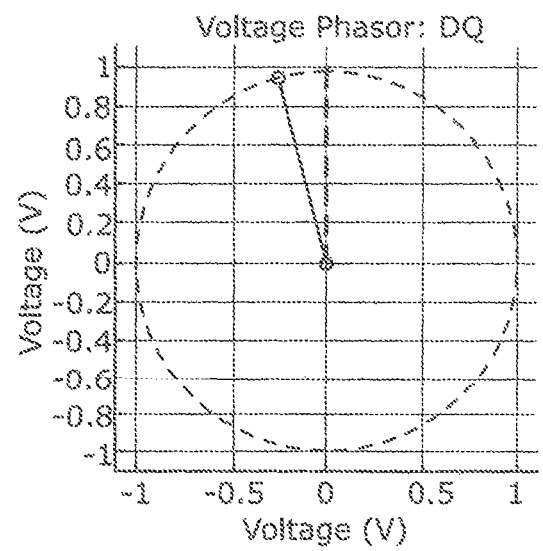
FIG. 5 shows the DQ motor phase voltages of FIG. 4 represented as a voltage phasor.
Figure 4:
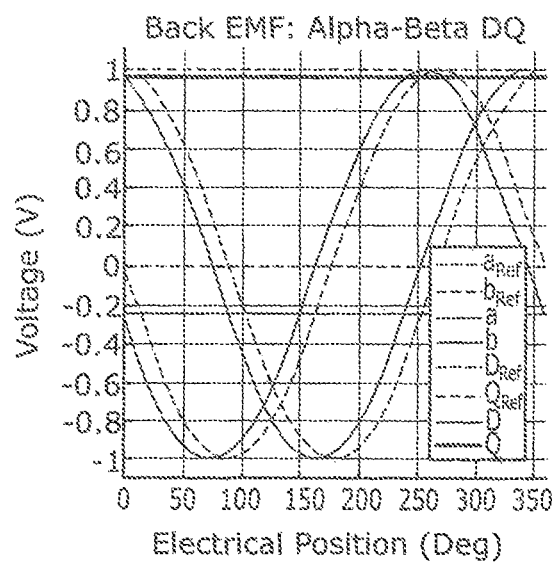
FIG. 4 shows the measurements of FIG. 3 converted into the αs reference frame and also subsequently into the DQ reference frame.
Figure 6:
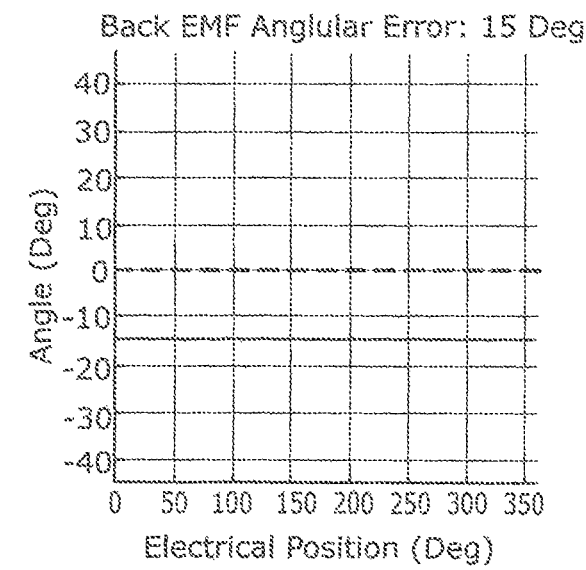
FIG. 6 shows the angular offset calculated from the DQ motor phase voltages of FIG. 5.

The next step in the process is to convert the signals into the DQ reference frame using as the position of the motor 10 a value representing the motor electrical position plus a position offset. The phase voltages in the $\alpha\beta$ and DQ reference frames are shown in FIG. 4. As shown in FIG. 2, the depicted embodiment then operates by controlling the position offset until the D-axis component of the motor phase voltage is zero. This step is achieved through the use of a PI controller, as is well-known in the art. At this point, it can be determined that the position offset is the same as the offset of the motor position sensor 16 relative to the electrical angle of the motor 10, i.e. the electrical angle offset. This is shown in DQ voltage phasor form in FIG. 5 and the angular error is then shown in FIG. 6.

As the position offset is fed back into the DQ transformation of the PI controller, the PI controller can be tuned according to how much time is available to calculate the electrical angle offset. This allows a balance to be achieved between the speed of response and the settling to a steady-state value, taking into account the fact that there is likely to be a level of noise in the system. For example, if the system response is too fast then any harmonic content in the phase voltages will be tracked and variation in the determined electrical angle offset will therefore be introduced.

Figure 7:
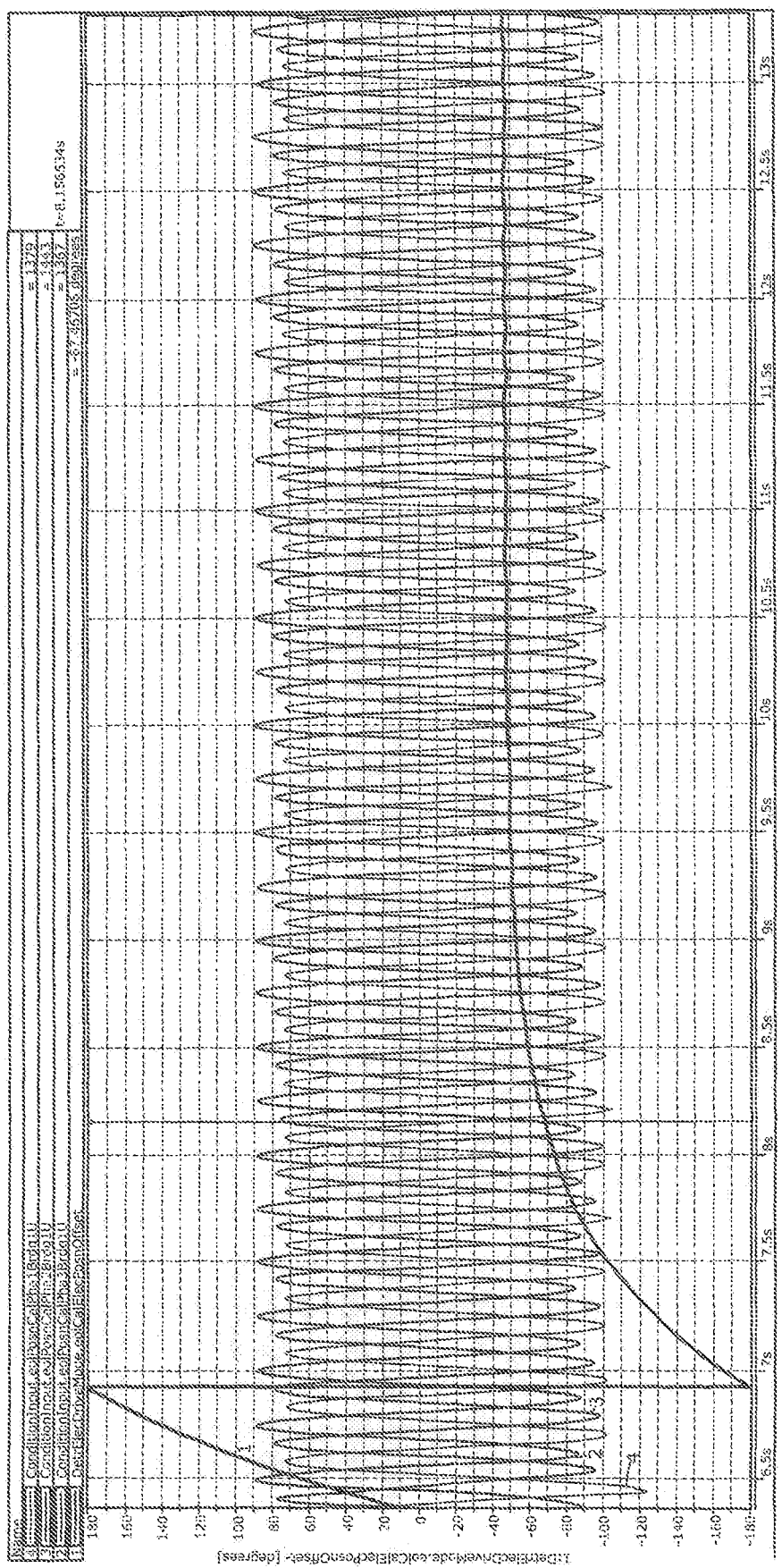
FIG. 7 shows an example of a controller operating an algorithm to determine electrical angle offset where the offset angle is about −46.5.

An example algorithm operating on the controller 116 is shown in FIG. 7. The trace includes the three motor phase voltages and the resultant response with the determined electrical offset value. The controller 116 has been tuned to have a steady-state settling time of 4 seconds. It can be seen that the electric offset value has been determined to be approximately −46.5°. The response is a first order response from 0° up to 313.5°, which is equal to −46.5°.

Where the velocity normalisation step has not been used, the controller 116 may utilise two different parameters to determine the electrical angle offset, depending on the direction of rotation of the motor 10. A first parameter can be used with the motor 10 rotating in a first direction, and a second parameter can be used with the motor 10 rotating in the opposite direction. The correct parameter will be automatically selected by the controller 116 depending on the direction of rotation to ensure that the correct electrical angle offset is determined. Where the velocity normalisation step has been included, these two different parameters are not necessary.

When operating the motor 10 at higher speeds, it may be beneficial to compensate for the time delay between receiving the signals and processing the signals to produce the electrical angle offset. In such cases, a filter may be used on the velocity signal to calculate an extrapolated position that compensates for the time delay. As such, the computed offset may be made to be invariant to speed for rotation of the motor 10.

The electric angle coefficient may also be filtered by an offset filter coefficient in order to minimise noise.

In place of determining the electrical angle offset by use of the controller 116 operating an algorithm, it is also possible to determine the electrical angle offset by directly using the inverse tangent ($\tan^{-1}$) function on the DQ values.

Figure 9:
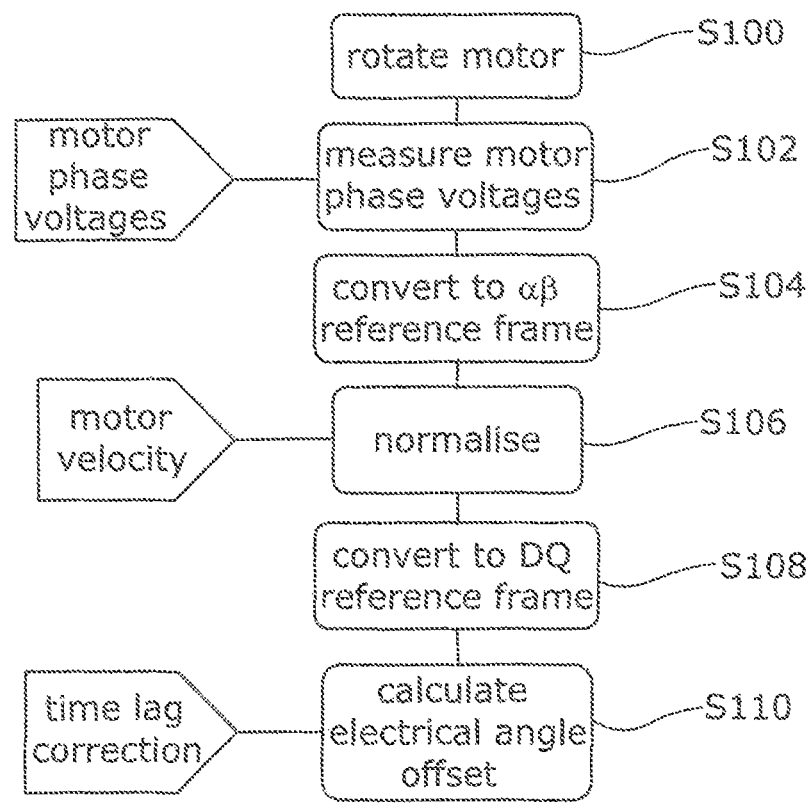
FIG. 9 shows a flow chart summarizing the method of the first aspect.

The embodiment of the method described above is summarised in the flow chart of FIG. 9. In a first step, the motor is rotated by the external drive system S100. The motor phase voltages are then received and measured by the controller S102. After this, the motor phase voltages are converted to the $\alpha\beta$ reference frame S104 and normalised with reference to the motor velocity S106. The motor phase voltages are then converted to the DQ reference frame S108 and the electrical angle offset can then be calculated S110.

What is claimed is:

1. A method of determining an electrical angle offset of a motor position sensor mounted to a multi-phase electric motor, the method comprising:
    rotating a rotor of the multi-phase electric motor at a motor velocity using an external drive system;
    measuring a motor phase voltage of each phase of the multi-phase electric motor, the motor phase voltage comprising a back-EMF generated by the rotation of the motor;
    converting the motor phase voltage to a DQ reference frame using as a position of the multi-phase electric motor a value representing a motor electrical position plus a position offset to form a DQ motor phase voltage;
    calculating the electrical angle offset from the DQ motor phase voltages by adjusting the position offset until a D-axis component of the DQ motor phase voltage is zero, at which point it can be determined that the position offset is equal to an offset of the motor position sensor relative to an electrical angle of the multi-phase electric motor corresponding to the electrical angle offset.

2. The method according to claim 1, wherein the motor phase voltages are first converted to an $\alpha\beta$ reference frame prior to conversion to the DQ reference frame.

3. The method according to claim 2, further comprising the step of normalising the motor phase voltages to the motor velocity to form normalised motor phase voltage prior to conversion into the DQ motor phase voltage.

4. The method according to claim 3, wherein the position offset is used in the step of converting the normalised motor phase voltage to the DQ reference frame to form the DQ motor phase voltage.

5. The method according to claim 4, wherein the step of calculating the electrical angle offset from the DQ motor phase voltages is performed by a closed loop controller.

6. The method according to claim 5, wherein the closed loop controller is a PI controller.

7. The method according to claim 3, wherein the step of calculating the electrical angle offset from the DQ motor phase voltages is performed by using an inverse tan function.

8. The method according to claim 7, wherein the step of calculating the electrical angle offset from the DQ motor phase voltages includes an application of a time lag correction to take into account the motor velocity when performing the calculation.

9. The method according to claim 8, wherein the time lag correction is applied by filtering a motor velocity signal indicative of the motor velocity with a time lag filter coefficient.

10. The method according to claim 9, wherein the motor velocity is a constant velocity.

11. The method according to claim 10, wherein the motor velocity is above a minimum motor velocity.

12. The method according to claim 11, wherein the motor velocity is below a maximum motor velocity.

13. The method according to claim 12, further comprising the step of removing DC offsets from the motor phase voltages.

14. The method according to claim 13, wherein, during operation of the method, a drive stage controller of the multi-phase electric motor is disabled.

15. The method according to claim 14, wherein the electrical angle offset is filtered with an offset filter coefficient.

16. The method of claim 1, further comprising:
   determining a rotation direction of the of the multi-phase electric motor; and
   selecting one of a first parameter or a second parameter from two different parameters based on the determined rotation direction, wherein the electrical angle offset is calculated based on one of the selected first or second parameters.

17. The method of claim 16, wherein the first parameter is selected in response to determining that the multi-phase electric motor is rotating in a first direction and the second parameter is selected in response to determining that the multi-phase electric motor is rotating in a second direction.

* * * * *